G. E. WATT.
CUTTING DEVICE FOR CABLES, CHAINS, AND THE LIKE.
APPLICATION FILED JULY 31, 1918.
1,313,435.
Patented Aug. 19, 1919.
4 SHEETS—SHEET 1.
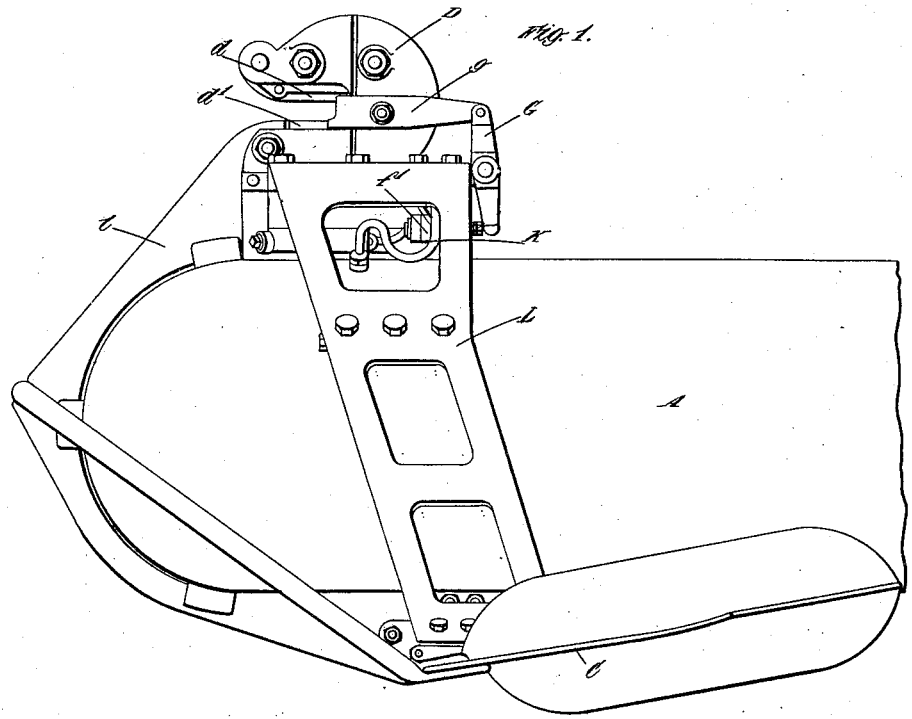
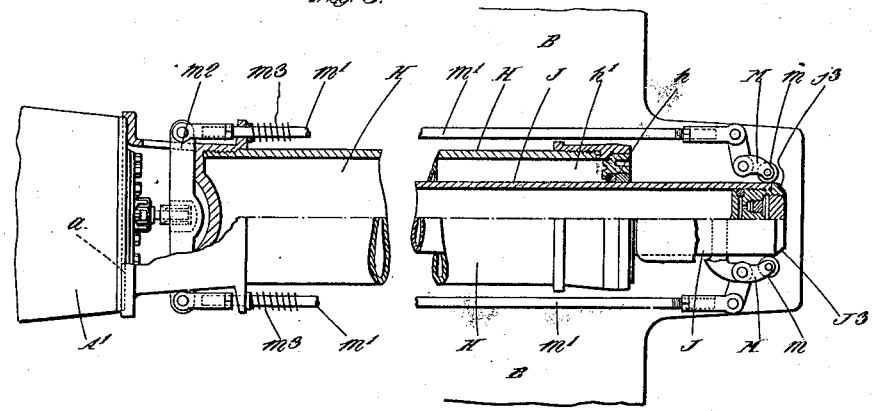
George Edwin Watt, Inventor
Pennie, Davis, Marvin & Edmonds,
Attorneys

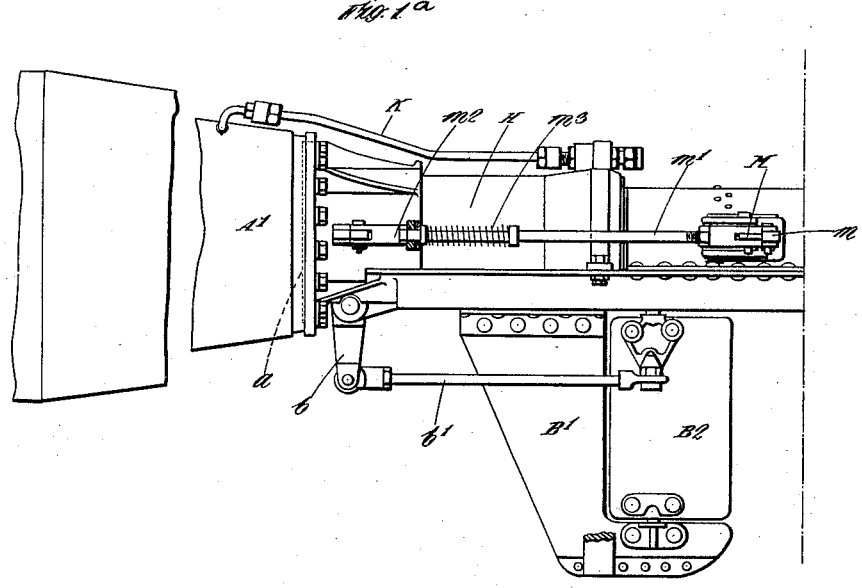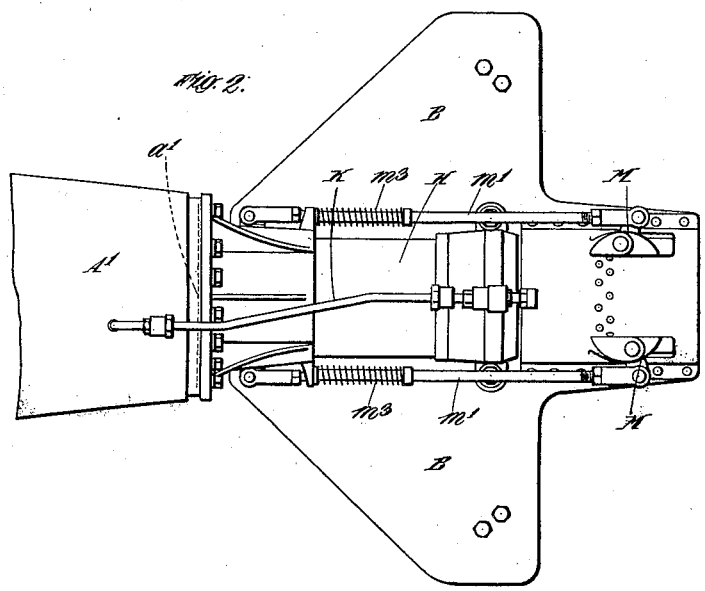

G. E. WATT.
CUTTING DEVICE FOR CABLES, CHAINS, AND THE LIKE.
APPLICATION FILED JULY 31, 1918.
1,313,435.
Patented Aug. 19, 1919.
4 SHEETS—SHEET 3.
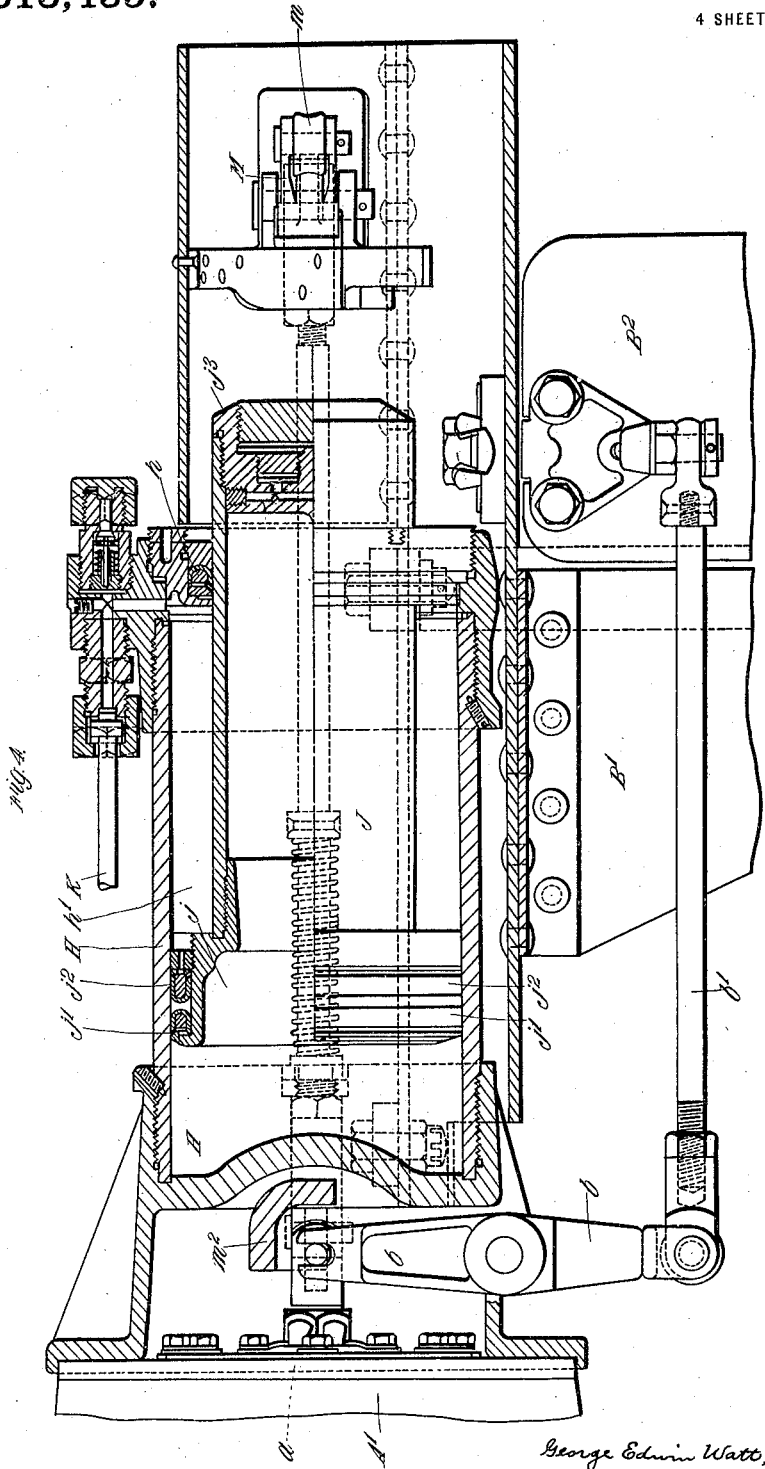
George Edwin Watt, Inventor
Pennie, Davis, Marvin & Edmonds,
attorneys.

G. E. WATT.
CUTTING DEVICE FOR CABLES, CHAINS, AND THE LIKE.
APPLICATION FILED JULY 31, 1918.
1,313,435.
Patented Aug. 19, 1919.
4 SHEETS—SHEET 4.
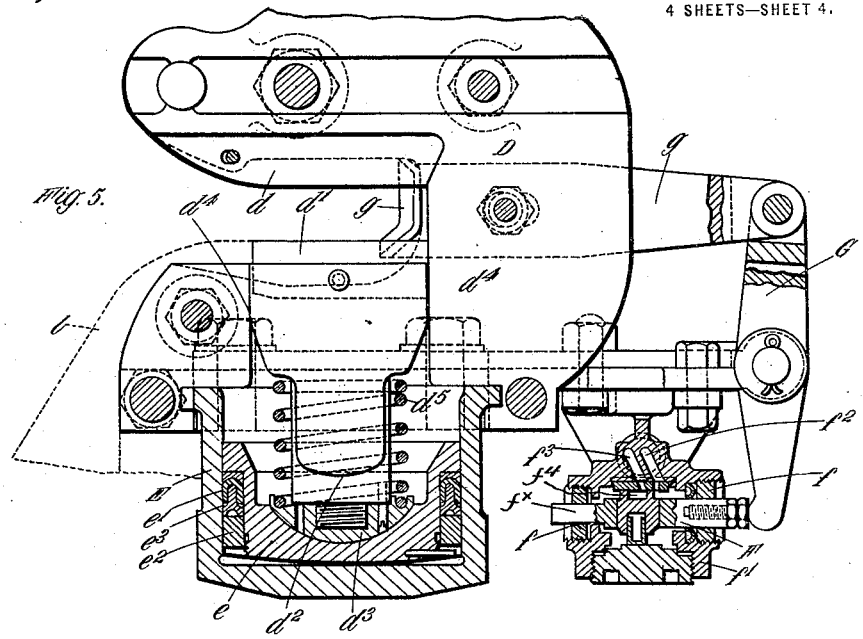
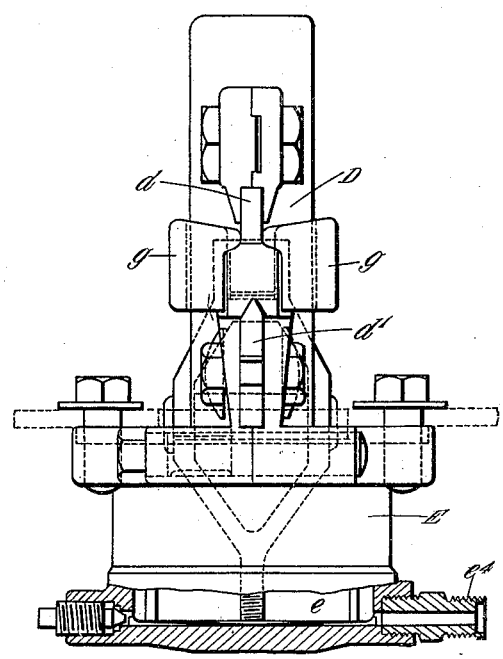

UNITED STATES PATENT OFFICE.

GEORGE EDWIN WATT, OF WESTMINSTER, LONDON, ENGLAND, ASSIGNOR TO VICKERS LIMITED, OF WESTMINSTER, ENGLAND.

CUTTING DEVICE FOR CABLES, CHAINS, AND THE LIKE.

1,313,435.   Specification of Letters Patent.   Patented Aug. 19, 1919.

Application filed July 31, 1918. Serial No. 247,511.

*To all whom it may concern:*

Be it known that I, GEORGE EDWIN WATT, a subject of the King of Great Britain, residing at Vickers House, Broadway, Westminster, in the county of London, England, have invented certain new and useful Improvements in or Relating to Cutting Devices for Cables, Chains, and the like, of which the following is a specification.

This invention relates to cutting devices for severing cables, chains and other connections employed more especially for submerged bodies, such as submarine mines. The device is one intended to be used in connection with a body or apparatus towed under water by a ship.

According to this invention the cutter, which is in the form of jaws between which the cable or other connection enters, is actuated by hydraulic pressure derived from the pressure of air or other gaseous fluid stored under high compression in a suitable vessel on or forming part of the towed body or apparatus. The cutter may comprise a pair of oppositely situated cutting blades between which the cable enters, one of the said blades being movable under the pressure of the liquid acting in a cylinder against a plunger or piston carrying the said blade, suitable hydraulic packing being provided around the plunger. The hydraulic apparatus is automatically brought into operation on the entry of the chain or cable between the jaws of the cutter, preferably by means of a small slide valve under the control of a trigger or lever arm actuated by the chain or cable. The slide valve cuts off the pressure and returns to normal position, as soon as the chain or cable has been cut through and is clear of the cutter, the valve at the same time putting the cylinder to exhaust. If desired it may also allow water pressure to be used to return the cutter and its piston to normal position, or a spring may serve for this purpose when the exhaust is opened.

The compressed air or gas supply vessel may be carried in the towed body or may be fitted on the outside of the body or may form part of a hydropneumatic device which transmits the pressure to the cutter piston. A gas, such as carbonic acid gas, may be used which is liquefied under the storage pressure employed and is allowed to expand into the hydropneumatic device for operation of the cutter. The said device may be in the form of a cylinder, preferably of substantial length, carrying a piston having a long tubular stem extending from one face through one end of the cylinder, the full area of the piston being utilized for the pneumatic pressure while the reduced area of the annular piston face results in increased pressure on the liquid, which is supplied to the cylinder through a non-return valve. A connection leads from the hydropneumatic cylinder to the cutter cylinder through the slide valve, which opens and closes communication between the two cylinders. The amount of gaseous fluid under pressure should be sufficient to provide for a number of cutting operations and the hydropneumatic cylinder may be of such a length as to allow the piston to move in successive stages, at each of which a cutting operation is performed, the arrangement of piston being such as to prevent leakage of gas through the piston leathers.

The cutter employed may comprise a pair of oppositely situated blades one of which is on the ram, the movement of the latter being limited so that the blades cannot come into contact; or cutters of shearing or other type may be employed.

The towed body may be provided with safety mechanism adapted to bring it to the surface when the hydropneumatic device has completed its work and is no longer able to effect further cutting operations. For this purpose the said device may effect the operation of a rudder controlling the depth of the towed body, so as to cause the body to rise to the surface.

In order that the said invention may be more clearly understood and readily carried into effect, reference will now be had to the accompanying drawings in which:—

Figure 1 is an elevation of a towed body carrying the cutter at its nose and Fig. 1ª is a continuation of Fig. 1 showing the hydropneumatic device on its tail section.

Fig. 2 shows the tail section, at right angles to Fig. 1.

Fig. 3 is a sectional view of the hydropneumatic device showing it at the end of its work and in position to operate the safety device.

Fig. 4 is a longitudinal section of the said device taken at right angles to Fig. 3; and Figs. 5 and 6 are respectively a side and a front elevation of the cutter, with parts in section.

A is the towed body the tail section A' of which carries the tail blades B, B' and the rudder B². The body A (which may carry an explosive charge) is shown of the type adapted to tow outwardly and downwardly by means of depressor planes or wings C fitted to the underside and extending laterally on both sides of the body. D is the cutter mounted on the upper side of the body A and provided with the upper fixed blade $d$ and the lower power operated blade $d'$, the two blades being placed opposite each other as shown in Fig. 6. E is a hydraulic cylinder in which moves a piston $e$ carrying the lower blade $d'$. F is a slide valve (see Fig. 5) controlling the admission of pressure liquid to the cylinder E and operated by the lever G and fork $g$ extending at each side of the cutter toward the gap between the jaws. H is the cylinder of the hydropneumatic device or intensifier mounted on the tail of the body A between the tail blades B. J is the hydraulic or intensifier ram or plunger in the cylinder H.

The ram J is formed with the enlarged piston end $j$ provided with the two opposed hydraulic packing rings $j'$, $j^2$ and the body of the ram is of substantially smaller diameter and passes through the packed gland $h$ at the end of the cylinder H leaving an annular space $h'$ which is filled with liquid usually water. The ram is hollow and forms with the front end of the cylinder H a chamber receiving a charge of carbonic acid or other compressible or gaseous fluid under high pressure. The charge may however be provided in a separate container in the body A or outside and led through suitable connections to the cylinder H.

From the cylinder H and communicating with the annular cylinder space $h'$ is a pipe K leading to the valve F and supplying liquid under pressure to the cutter cylinder E. The cutter, cylinder, valve and attached parts are carried on the body A near its nose by means of the frame L (Fig. 1) secured around the body and over the nose and the front part of the frame is provided with a guiding or fender plate $l$, which assists in leading a crossing cable or chain between the jaws of the cutter. The towing cable (not shown), is attached to the body A at the nose end, below the cutter.

The piston $e$ carrying the cutter blade $d'$ is provided with a cup leather $e'$ secured in place by a screwed ring $e^2$ and a perforated inner ring $e^3$ which insures the liquid pressure acting upon the inner faces of the cup leather to provide a liquid tight joint. The packing rings $j'$, $j^2$ of the ram piston $j$, serving respectively for the carbonic acid and the liquid, may be constructed in a similar manner.

The valve F (Fig. 5) is in the form of a slide valve passing through glands $f$ in the casing $f'$ and normally pressed against the lever G by the internal pressure of the liquid in the casing, the valve and $f^\times$ distant from the lever being slightly smaller than the adjacent end. Owing to the difference in diameter there is an excess of pressure due to the liquid under pressure in the casing $f'$ which causes the valve F to be pressed toward the right hand side. The valve is shown in position for supplying liquid under pressure to the cylinder E through a tube leading from the valve to the nipple $e^4$ (Fig. 6) of the cylinder, the pipe K (which passes inside the body A from the tail section to the nose end) admitting the liquid from the annular space $h'$ of the cylinder H to the interior of the valve casing. The latter is provided with the admission port $f^2$ and the exhaust port $f^3$ through the first of which the liquid passes to the cylinder E when the valve is in the position shown in Fig. 5. On the return movement of the valve F the ports $f^2$ and $f^3$ are placed in communication with each other through the recess $f^4$ in the upper face of the valve F and the cylinder E is therefore opened to the exhaust and the liquid allowed to flow into the surrounding water.

The general operation of the power cutter is as follows:—

On a chain or cable entering between the jaws of the cutter D it meets the front end of the fork $g$, pressing the latter back and causing the lever G to move the slide valve F to the left (Fig. 5). This action cuts off the cylinder E from the exhaust through the port $f^3$ and opens it to the interior of the valve casing through the port $f^2$. There is permanent communication between the valve casing and the annular space $h'$ of the intensifier cylinder H, which space is filled with liquid under the very high pressure due to the pressure of the carbonic acid or other gas in the hollow ram J and cylinder H acting upon the piston $j$ of the ram. Liquid under this pressure therefore is admitted to the cylinder E and acts on the piston e moving up the bottom blade d' of the cutter D against the fixed upper blade d, so as to sever the cable or chain. The upper blade d may have a square lower edge, as shown, the lower blade d' having a wedge shaped or angular edge or any other suitable form of edge may be employed.
The shank d² of the cutter d' is not fixed to the piston e but is carried on the spherical bearing piece d³ resting in a spherical seating in the said piston, the cutter d' moving in guides d⁴.
On the cable or chain being severed it falls away and releases the fork g and lever G, whereupon the valve F returns automatically to exhaust position, allowing the cutter piston e and cutter blade d' to be returned by the spring d⁵ to the position shown in Fig. 5, ready for the next operation. The amount of pressure liquid employed is measured by the volume swept out by the piston e and this is considerably less than the available supply in the cylinder H so that the ram J and piston j move through only a fraction of their complete stroke for each cutting operation and are therefore ready for the next cut as soon as a new cable enters the cutter. The ram J may, for example, be arranged to effect six cuts in successive movements before the end of its complete stroke is reached and the gas has been allowed to expand to the full volume allowed.

When the ram reaches the end of its stroke and the cutter can no longer be operated the safety device comes into operation to bring the towed body A to the surface.
This safety device, in the construction shown, comprises a pair of bell crank levers M with rollers m adapted to meet the chamfered end j³ of the ram J when the latter reaches the end of its stroke (as shown in Fig. 3), and connecting rods m' with cross bar m² attached to the end of the lever b which in turn is connected to the rudder B² through the connecting rod b'. The rods m' are provided with springs m³ to keep the levers M in position. The lever b may be connected to a diaphragm indicated at a and closing the tail section A', the diaphragm serving as a depth control device, the pressure of the water acting on the diaphragm to move the rudder B² so as to cause the towed body, which is towed in an inclined position, to rise or sink when the hydrostatic pressure exceeds or is less than a predetermined pressure. The action of the ram, at the end of its series of partial strokes, upon the levers M and connections is in such a direction as to move the rudder over against the control of the diaphragm, into a position which causes the body A to rise to the surface, thus indicating that the cutter is no longer operative and preventing the body becoming entangled with a cable it is no longer able to cut. The cylinder H and ram J can be recharged with gas under pressure, when the cutter is ready for another series of operations.

What I claim and desire to secure by Letters Patent of the United States:—

1. A towed body, a power operated cutter mounted upon the said body, a hydraulic pressure device adapted to operate the said cutter, means for storing gaseous fluid under high compression and means for operating the hydraulic device by the gaseous pressure.

2. A towed body, a power operated cutter mounted upon the said body, a hydraulic device adapted to operate the cutter by liquid supply under pressure, a ram by which the liquid is subjected to pressure, and means for storing gaseous fluid under high compression for action on the hydraulic ram.

3. A towed body, a power operated cutter mounted upon the said body, a hydraulic device adapted to operate the cutter, a ram by which the liquid is subjected to pressure, the said ram being provided with an enlarged piston head, and means for storing gaseous fluid under high compression for action on the enlarged piston portion of the ram, the liquid under pressure filling the annular space surrounding the ram.

4. A towed body, a power operated cutter mounted on the said body, a hydraulic device adapted to operate the said cutter under liquid pressure, a cylinder supplied with the liquid and a hollow ram within the said cylinder, adapted to be filled with highly compressed gaseous fluid which acts upon the ram to subject the liquid to pressure.

5. A towed body, a power operated cutter mounted on the said body, which cutter comprises a pair of opposing blades, one of which is movable, a plunger carrying the movable blade, a cylinder within which the plunger acts under hydraulic pressure, means for storing gaseous fluid under high compression, and means for utilizing the said fluid to produce the required hydraulic pressure for operation of the cutter.

6. A towed body, a power operated cutter mounted upon the said body, which cutter comprises a pair of cutting blades, means for guiding the object to be cut between the said blades, a hydraulic device for operating the cutter, and means by which such hydraulic device is brought into operation on the entry of the object to be cut between the cutter blades.

7. A towed body, a power operated cutter mounted on the said body, which cutter comprises a pair of opposing cutting blades, means for guiding an object to be cut between the said blades, a hydraulic pressure device adapted to operate the cutter, means for storing gaseous fluid under high compression, means for utilizing the gaseous fluid for operation of the hydraulic pressure device, a valve controlling the supply of liquid under pressure to the cutter operating mechanism and means for guiding the said valve automatically on the entry of the object to be cut between the cutter blades.

8. A towed body, a power operated cutter mounted on the said body, which cutter comprises a pair of opposing cutting blades, means for guiding the object to be cut between the said blades, a hydraulic plunger adapted to operate a cutting blade, a cylinder within which the plunger works, a slide valve adapted to supply hydraulic pressure to the said cylinder and to place the cylinder to exhaust, lever mechanism operating the said valve and adapted to be actuated on the entry of the object to be cut between the cutting blades, a liquid pressure supply device connected to the valve and cylinder of the cutter, and means for obtaining the liquid pressure from gaseous fluid stored under high compression.

9. A towed body, a power operated cutter mounted on the said body, a hydraulic pressure device adapted to operate the said cutter, means for storing gaseous fluid under high compression, and a hydraulic ram adapted to be acted upon by the fluid pressure and to supply the hydraulic pressure to the cutting mechanism in a succession of stages, each stage effecting a cutting operation.

10. A towed body, a power operated cutter mounted on the said body and comprising a fixed and a movable blade, a fixed guide within which the movable blade works, a plunger provided with a spherical bearing for the movable blade and means for supplying hydraulic pressure to the said plunger.

11. A towed body, a power operated cutter mounted on the said body and a safety device adapted automatically to bring the towed body to the surface when the power supply of the cutter is exhausted.

12. A towed body, a power operated cutter mounted on the said body, a depth control rudder on the body and means for operating the said rudder automatically when the power supply of the cutter is exhausted, so as to cause the towed body to rise to the surface.

13. A towed body, a power operated cutter mounted on the said body, a depth control rudder, cutter operating mechanism, a hydraulic ram adapted to supply liquid under pressure to the said mechanism in a succession of stages, and connections from the ram to the rudder adapted to move the latter over into a position which brings the towed body to the surface when the ram reaches the end of its working stroke.

In witness whereof I affix my signature.

GEORGE EDWIN WATT.